Figure 1:
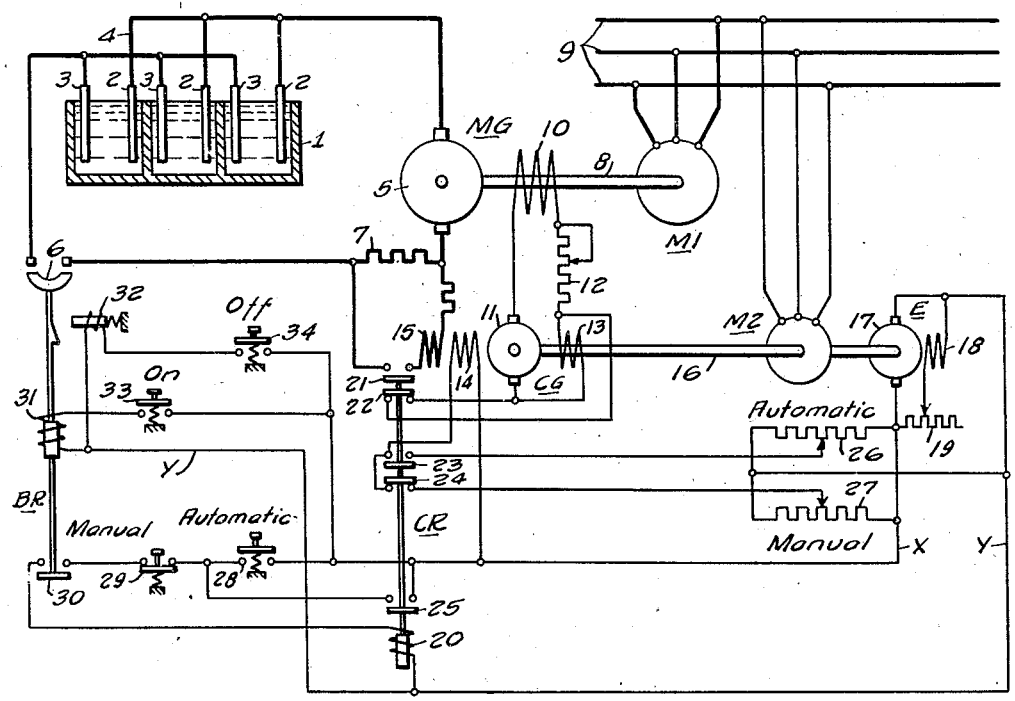

April 24, 1945.  W. R. HARRIS  2,374,199

CURRENT REGULATOR FOR ELECTROLYTIC PLANTS

Filed Jan. 7, 1944

INVENTOR
Walter R. Harris.
BY
Paul E. Friedemann
ATTORNEY

Patented Apr. 24, 1945

2,374,199

UNITED STATES PATENT OFFICE 2,374,199

CURRENT REGULATOR FOR ELECTROLYTIC PLANTS

Walter R. Harris, Wilkinsburg, Pa., assignor to Westinghouse Electric & Manufacturing Company, East Pittsburgh, Pa., a corporation of Pennsylvania Application January 7, 1944, Serial No. 517,305

8 Claims. (Cl. 171—223)

My invention relates to current regulating systems for electrolytic plants, in particular, cell lines.

A customary control system for cell lines contains a generator as the source of the operating electrolytic current and is provided with a current-sensitive vibrating relay which controls the adjustment of a motor driven rheostat in the field circuit of the generator by reversing the rotation of the rheostat motor, thereby varying the field strength of the generator in such a manner as to keep the current constant.

This known control system requires exactive maintenance in order to keep the vibrating relay and the association contactors in satisfactory operating condition. The system is also inherently slow since the vibratory relay has to operate the contactors and then the motor driven rheostat before a control impulse is transmitted to the generator field.

It is an object of my invention to provide a current control system for electrolytic cells that avoids the disadvantages of the known systems. More particularly, the invention is intended to eliminate vibrating relays and reversing relays or the like contactors which in the known system are actuated continually during the operating period of the electrolytic equipment. Another object is to provide a control of the type referred to which affords a considerably greater speed of response and thereby an improved accuracy of control.

An object of my invention is further to devise a current supply and control system for electrolytic operations that affords an automatic control operation and permits, selectively, a manual variation of the cell current through a broad range of adjustment, while a single device in the generator field circuit is used for performing both the automatic and the manual control operations as selected by the attendant. It is also an object of the invention to provide an electrolytic current supply system of the type just mentioned with protective means which transfer the control automatically from automatic to manually adjustable operation upon occurrence of operating conditions apt to disturb the setting or proper functioning of the automatic operation.

In order to achieve these objects, my invention, in one of its aspects, involves the combination of a main generator for producing the electrolyte current with a control generator when armature is electrically connected to the main generator field winding and acted upon by the following control field windings:

(1) A first field winding for providing basic excitation of the control generator. This winding, according to another feature of the invention, is self-exciting and preferably connected in series with the field winding of the main generator so that the current will build up in both at substantially the same rate;

(2) A second winding, hereinafter called the "pilot" field winding, which is connected in some suitable way with the main generator output circuit so that its excitation is a measure of the current to be controlled;

(3) A third winding, hereinafter called the "pattern" field winding which is wound or energized for differential action relative to the pilot field winding so that the excitation of the two windings is balanced and hence ineffective as regards the control of the main generator when the current measured by the pilot field winding is in accordance with a selected voltage setting of the current exciting the pattern field winding.

In conjunction with the three control fields of the control generator, the invention requires selective control means, such as relay devices controlled by operator-actuated push buttons, which connect the pattern field winding selectively with two separately adjustable voltage supply devices, preferably two potentiometers connected to a common direct current source of constant voltage, one serving for setting the datum value of the automatic control while the other is designed for varying the main generator current during periods of manual control. The selective control means are also connected with the two other field windings of the control generator so that both other windings are operative when the pattern field winding is set for automatic control and inoperative as long as the system is under manual operation.

Figure 2:
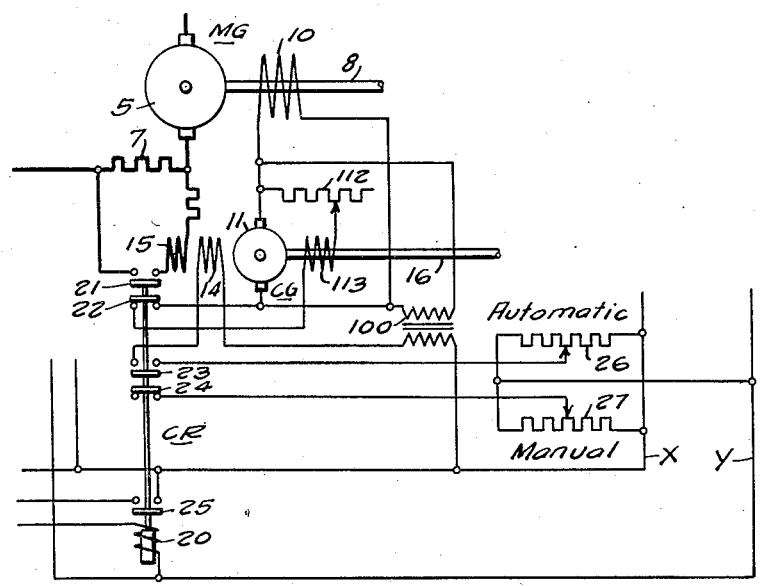

These and other features of my invention are embodied in the control systems for electrolytic cell lines illustrated in the drawing in which Fig. 1 represents a complete circuit diagram of such a system, while Fig. 2 is a partial illustration of a similar system for elucidating certain modifications which can be made within the scope of the invention.

In Fig. 1, numeral 1 represents a cell line for galvanizing or other electrolytic operations. The electrodes of different polarity denoted by 2 and 3, respectively, are connected to a pair of busses 4 which are energized by a main generator MG whose armature 5 is connected with the bus circuit through the contact device 6 of a circuit breaker BR and also through a series resistor 7. The voltage drop across the resistor 7 is proportional to the current supplied by the main generator to the cell line, and hence a measure of this current.

The armature 5 of the main generator is connected by a shaft 8 with a motor M1 fed from a suitable current source 9. This motor drives the generator at constant speed and is preferably of the synchronous type.

The main generator has a field winding 10 energized by a control generator CG whose armature 11 is series connected with field winding 10 through an adjusting rheostat 12 and the self-exciting field winding 13 of the control generator. The pattern field winding of generator CG is denoted by 14 and the pilot field winding by 15. The armature 11 is driven by a constant speed motor M2 which in the illustrated system is connected to the above-mentioned current source 9 and is preferably of the synchronous type. It will be obvious that instead of using two constant speed motors M1 and M2, the armatures of the main generator and the control generator may be placed on a common shaft and driven by a single motor. The shaft 16, according to the illustrated system, carries also the armature 17 of an exciter E whose self-exciting field winding 18 is shunt connected through an adjusting or calibrating resistor 19. The exciter E serves as a direct-current source of constant voltage for feeding the exciter mains X and Y.

In order to control the connections of the pattern field winding and pilot field winding in the manner explained in the foregoing, a relay CR is provided whose energizing coil 20 controls 5 contacts denoted by 21 through 25, respectively. The pilot field winding 15 is connected across the measuring resistor 7 and the output circuit of the main generator MG, and this connection is controlled by the relay contact 21. The self-exciting winding 13 is controlled by relay contact 22 and is shorted thereby in the illustrated inoperative condition of the control relay. The pattern field winding 14 is connected with relay contacts 23 and 24 which, in turn, are in connection with the sliders of two potentiometers 26 and 27, respectively, which are both connected across the excited mains X and Y.

Two push buttons 28 and 29 are provided for controlling the operation of the relay coil 20, the contact 25 serving to establish a self-sealing circuit for the coil when button 28 has been pressed. The energizing circuit of coil 20 extends also through an interlock contact 30 of the above-mentioned circuit breaker BR. Numeral 31 represents the closing coil of the circuit breaker and numeral 32 the coil for actuating the release mechanism. The breaker is biased to maintain its main contact 6 in the illustrated open position and is latched in the closing position upon energization of coil 31 until the release coil 32 is actuated. Two push buttons 33 and 34, respectively, serve to operate the two breaker coils.

The control system operates as follows: When the two constant speed motors M1 and M2 are energized and at full speed with the push buttons in the inoperative position shown in the drawing, the cell line circuit is interrupted at 6, the self-exciting field winding 13 of the generator is inoperative because shorted at 22, and the pilot field winding 15 is also ineffective due to the interruption of its circuit at 21. The pattern field winding 14 of the control generator is connected through contact 24 with the potentiometer 27 which is energized by the exciter E. Pressing of push button 33 will now energize the coil 31 closing the circuit breaker contact 6 and thereby completing the cell line circuit. The system is now set for manual control operation. The only field winding now operative in the control generator CG is the pattern field winding 14. The excitation of this winding and hence the output voltage of the control generator and the excitation of the main generator field winding 10 are now determined by the setting of the potentiometer 27. As a result, the attendant can vary the current of the cell line circuit at will by varying the adjustment of potentiometer 27.

In order to change from manual to automatic operation, the push button 28 is to be actuated. As a result, the circuit of relay coil 20 is closed extending through the elements X, 28, 29, 30, 20, Y. Relay contact 25 shunts the push button 28 so that a self-holding circuit remains closed upon release of button 28. Contact 24 is opened, thereby disconnecting the potentiometer 27 for manual control, while contact 23 is closed, thereby connecting the pattern field winding 14 to the potentiometer 26. At the same time, the short circuit of the self-exciting field winding 13 is interrupted at contact 22 and the measuring circuit for energizing the pilot field winding 15 closed by contact 21. The output voltage of the control generator CG, the excitation of the main generator winding 10, and the current in the cell line circuit are now dependent on the resultant excitation of the control generator produced by all of its three fields 13, 14 and 15. The excitation of the pattern field 14 depends on the setting of potentiometer 26. This setting is chosen in accordance with the current magnitude to be maintained constant in the cell line circuit. Since the resultant control effect of the pattern field winding 14 and the pilot field winding 15 is differential, these effects will balance each other when the cell line current measured by the pilot field is in accordance with the setting of the potentiometer 26. At the point of balance the field excitation of the main generator is determined only by that of the self-exciting winding 13. If the cell line current departs from the balance value, the excitation of one of the differential control fields will overbalance that of the other so that a control effect is produced which is additive or subtractive to that of field winding 13 depending upon the direction of the departure of the cell line current from the datum value set by the potentiometer 26. As a result, the field excitation of the main generator is changed in a sense tending to restore the current to the datum value.

Let us assume, for instance, that the current in the cell line circuit becomes too high due to a short circuit or other irregularity in one or several cells. The pilot field winding 15 will then assume more ampere turns than the pattern field winding 14. The resultant differential excitation is subtractive as regards that of field winding 30 so that the output voltage of the control generator is reduced, thereby diminishing the field strength in the main generator and hence the generator output voltage with the effect to reduce the cell line current to the regulated value. When the current reaches this value, the pattern field and pilot field of the control generator are again balanced so that the equipment will remain in this condition until some other disturbance occurs. In order to achieve the just-mentioned control effect, the circuit of the self-energizing field winding 13 is so designed that its resistance line coincides substantially with the air gap line of the no-load saturation curve of this field. Consequently, the output voltage of the control generator is maintained by means of the self-energizing field without any magnetomotive force being supplied from the differential fields.

As a rule, no additional anti-hunting means are necessary in the above-described system. This is due to the fact that by virtue of the above-mentioned series connection of the main field winding 10 and the self-energizing field winding 13 of the control generator, the rate of change of the current in both windings is substantially the same. Thus, as the current in the armature 5 of the main generator approaches its adjusted value, the control generator CG is operating very nearly at the current voltage so that the hunting tendency of the control effect is reduced to a negligible amount.

If during the automatic controlled operation of the system, the circuit breaker BR should be opened by actuating the release button 34 or any other cause, or, for instance, if this circuit breaker is provided with self-interrupting means for overload protection, the interlock contact 30 is opened, thereby interrupting the energizing circuit of the relay coil 20. Consequently, the relay returns into the illustrated position and renders pilot field winding 15 and the self-exciting field winding 13 of the control generator inoperative while switching the pattern field winding 14 over to the manual control potentiometer 27. Therefore, in the case of a disturbance of the kind mentioned, the system is immediately, and without action by the attendant, returned to an operating condition where the output voltage of the main generator is determined by the manual regulating means. This prevents the occurrence of undesirably high voltages in the cell line circuit. That is, if the cell line circuit is opened when the system is under automatic control, the generator voltage would rise to a high value as limited merely by the saturation of the main generator and control generator. This is due to the fact that the interruption of the cell line circuit removes the excitation from the pilot field winding 15 while the pattern field remains at full strength. Thus the equipment raises the voltage under its normal tendency to produce current, but since no current can be consumed, the generator voltage will increase to an extremely high value. However, the interlock means described in the foregoing permit the continuance of an automatic control operation only as long as both differential field windings are properly operative and, by deenergizing the self-exciting winding 13 under conditions where the pilot field winding 15 is not excited, eliminate the possibility of excessive voltage peaks.

In order to obtain best results in a system according to the invention, the operating range of the control generator CG should be on the straight portion of its saturation curve. As a matter of fact, the accuracy of control depends on how far the resistance line departs from the saturation curve. In systems where accuracies of 2% to 3% plus or minus are sufficient standard iron can be used in the magnetic frame and pole structure of the control generator. Where a more exacting regulation is desired, the use of highly permeable iron, such as is known under the trade name Hypernik, may be employed in order to reduce or eliminate hysteresis effects. The above-described control system can be modified, for instance, as shown in Fig. 2 which represents mainly the modified portions of the system, the not illustrated other portions being identical with the corresponding parts of Fig. 1, as is apparent from the use of the same reference numerals for corresponding elements.

According to Fig. 2, the self-excited field winding of the control generator CG is a shunt winding 113 and connected through a resistor 112 across the armature 11. Furthermore, the pattern field winding 14 is series connected with the secondary of a damping or anti-hunting transformer 100 whose primary is also connected across the armature of the control generator CG. Such an anti-hunting transformer may also be added to a system according to Fig. 1 but, while it is advantageous in certain cases, either system will operate also without the addition.

The essential operation of a modified system according to Fig. 2 is substantially similar to that of Fig. 1 as described in the foregoing.

While I have exemplified my invention by the illustrative control system for feeding operating current to an electrolytic cell line, it will be understood that substantially the same system and also the use in connection with other equipment in which similar operating conditions occur. In view of such modifications of my invention, and also in consideration of the variations which are indicated in the preceding specification or will be obvious to those skilled in the art upon studying this disclosure, I wish this specification to be understood as illustrative rather than in a limiting sense.

I claim as my invention:

1. A current regulator for electrolytic cells, comprising a cell circuit, a main generator connected with said circuit for supplying direct current thereto and having a main field winding, a control generator connected with said main field winding for supplying variable excitation thereto and having a self-exciting field winding series connected with said main field winding and a pilot field winding connected with said circuit to be energized in accordance with said current and a pattern field winding for differential action relative to said pilot field winding, means for driving said main generator and said control generator at essentially constant speed, two current supply devices of adjustable output voltages for exciting said pattern field winding, and control means for connecting said pattern field winding selectively with one of said devices while maintaining said self-exciting and pilot field windings effective and with said other device while rendering said latter two windings ineffective.

2. A current regulator for electrolytic cells, comprising a cell circuit and a circuit breaker therein, a main generator disposed for supplying current to said circuit and having a main field winding, a control generator connected with said main field winding for supplying variable excitation thereto and having a self-exciting field winding connected with said main field winding and a pilot field winding connected with said circuit to be energized in accordance with said current and a pattern field winding for differential action relative to said pilot field winding, means for driving said main generator and said control generator at substantially constant speed, two current supply devices of adjustable output voltages for exciting said pattern field winding, and control means for connecting said pattern field winding selectively with one of said devices while maintaining said self-exciting and pilot field windings effective and with said other device while rendering said latter two windings ineffective, said control means being interlocked with said circuit breaker so as to connect said pattern winding with said latter device when said breaker is opened.

3. A current regulator for electrolytic cells, comprising a cell circuit, a main generator connected with said circuit for supplying direct current thereto and having a main field winding, a control generator connected with said main field winding for supplying variable excitation thereto and having a self-exciting field winding connected with said main field winding and a pilot field winding connected with said circuit to be energized in accordance with said current and a pattern field winding for differential action relative to said pilot field winding, means for driving said main generator and said control generator at substantially constant speed, a current source of constant voltage, two potentiometric devices connected with said source, and relay means for connecting said pattern field winding selectively with one of said devices while maintaining said self-exciting and pilot field windings operative and with said other device while maintaining said latter two windings inoperative.

4. A current regulating control system comprising a circuit to be controlled, a main generator connected with said circuit to supply current thereto and having a main self-exciting field winding series connected with said main field winding and a pilot field winding connected with said circuit to be energized in accordance with said current and a pattern field winding for differential action relative to said pilot field winding, means for driving said main generator and said control generator at substantially constant speed, a source of a pattern voltage for automatic control of said main generator and another voltage source adjustable independent of the voltage of said first source for manual control of said main generator, sources while maintaining said self-exciting and pilot field windings operative and with said other source while maintaining said latter two windings inoperative, and contact means actuable by the operator for controlling said relay means.

5. A current regulating control system comprising a circuit to be controlled, a main generator connected with said circuit to supply current thereto and having a main self-exciting field winding series connected with said main field winding and a pilot field winding connected with said circuit to be energized in accordance with said current and a pattern field winding for differential action relative to said pilot field windings, means for driving said main generator and said control generator at constant speed, a source of a pattern voltage, a source of constant voltage and two independently adjustable potentiometers connected thereto for providing two pattern voltages, relay means for connecting said pattern field winding selectively with one of said potentiometers while maintaining said self-exciting and pilot field windings operative and with said other potentiometer while maintaining said latter two windings inoperative, operator-controlled contact means for controlling said relay means, and a circuit breaker disposed for controlling said circuit and having an interlock contact for causing said relay means to connect said pattern field winding with said latter potentiometer when said circuit is interrupted.

6. A current regulator for electrolytic cells, comprising a cell circuit, a main generator connected with said circuit for supplying direct current thereto and having a main field winding, a control generator connected with said main field winding for supplying variable excitation thereto and having a self-exciting field winding series connected with said main field winding and a pilot field winding connected with said circuit to be energized in accordance with said current and a pattern field winding for differential action relative to said pilot field winding, means for driving said main generator and said control generator at substantially constant speed, a source of constant voltage and two independently adjustable potentiometers connected thereto for providing two pattern voltages for automatic and manual control respectively of said main generator, relay means for connecting said pattern field winding selectively with one of said potentiometers while maintaining said self-exciting and pilot field windings operative and with said other potentiometer while maintaining said latter two windings inoperative, operator-controlled contact means for controlling said relay means.

7. A current regulator for electrolytic cells, comprising a cell circuit, a main generator connected with said circuit for supplying direct current thereto and having a main field winding, a control generator connected with said main field winding for supplying variable excitation thereto and having a standard field winding for providing basic excitation and a pilot field winding for providing excitation in accordance with said current and a pattern field winding acting differentially as regards said pilot field winding so as to be capable of balancing the effect of the latter, two current supply devices of adjustable output voltages for exciting said pattern field winding, and control means for connecting said pattern field winding selectively with one of said devices while maintaining said standard and pilot field windings operative and with said other device while maintaining said latter two winding inoperative.

8. A current regulator for electrolytic cells, comprising a cell circuit, a main generator connected with said circuit for supplying direct current thereto and having a main field winding, a control generator connected with said main field winding for supplying variable excitation thereto, said control generator having an armature, a self-exciting field winding connected with said main field winding and a pilot field winding connected with said circuit to be energized in accordance with said current and a pattern field winding for differential action relative to said pilot field winding, a damping transformer having a primary connected across said armature and a secondary series-connected with said pattern field winding, means for driving said main generator and said control generator at essentially constant speed, two current supply devices of adjustable output voltages for exciting said pattern field winding, and control means for connecting said pattern field winding selectively with one of said devices while maintaining said self-exciting and pilot field windings effective and with said other device while rendering said latter two windings ineffective.

WALTER R. HARRIS.